[19] United States Patent
Rausch

[11] 3,915,297
[45] Oct. 28, 1975

[54] CARTRIDGE CONTAINING SELF-SETTING COMPOSITION FOR USE IN FIXING ELEMENTS IN A SUBSTRATE AND METHOD OF MAKING SAME

[76] Inventor: Paul Gilger Rausch, 8405 Wainstead Drive, Parma, Ohio 44129

[22] Filed: Oct. 15, 1974

[21] Appl. No.: 514,515

[52] U.S. Cl. .............................................. 206/219
[51] Int. Cl.² ........................................ B65D 77/08
[58] Field of Search .................................. 206/219

[56] References Cited
UNITED STATES PATENTS

| 3,385,427 | 5/1968 | Stouls | 206/223 |
| 3,731,791 | 5/1973 | Fourcade | 206/219 |

FOREIGN PATENTS OR APPLICATIONS

| 2,057,120 | 5/1971 | France | 206/219 |

Primary Examiner—Leonard Summer
Attorney, Agent, or Firm—Caesar, Rivise, Bernstein & Cohen

[57] ABSTRACT

A cartridge containing a self-setting composition, preferably comprising an interactive resin component and a hardener therefor, is formed of a single piece of skin. The skin is folded into tubular form with one side portion overlapping the other, and the margin of the overlying side portion is heat sealed to the underlying side portion, preferably by means of a heat sealable adhesive coated on the skin, which adhesive is not resistant to an ingredient of the interactive component, e.g. styrene. A flap is defined by the underlying side portion, and one interactive component is located on each side of the flap. The flap stops short of the facing wall, and the interactive components meet in the gap and react together to a polymerised interface. A method of making the cartridge is disclosed.

7 Claims, 4 Drawing Figures

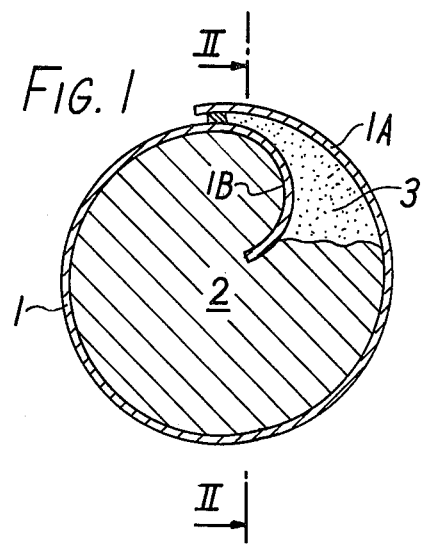
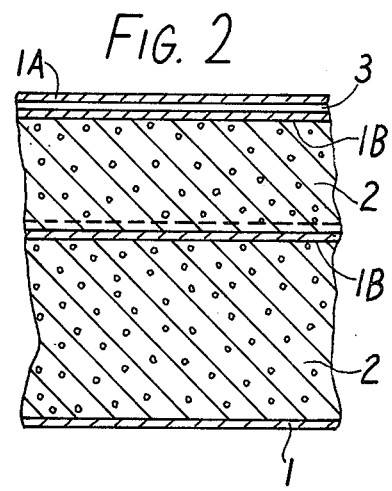
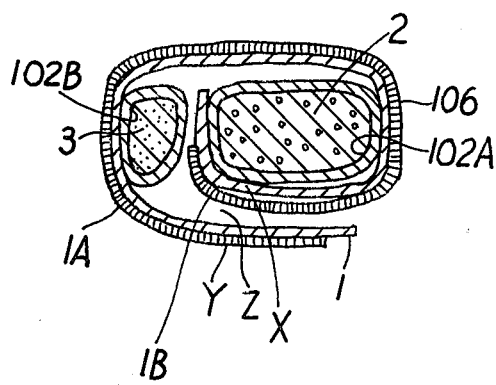

CARTRIDGE CONTAINING SELF-SETTING COMPOSITION FOR USE IN FIXING ELEMENTS IN A SUBSTRATE AND METHOD OF MAKING SAME

The invention relates to securing a fixing element in a substrate, for example an anchor bolt in a borehole in a rock substrate such as a tunnel or mine, using a self-setting composition. In particular, the invention relates to techniques for securing and fixing elements using cartridges containing pre-portioned quantities of interactive compounds of the self-setting composition, and above all to such cartridges where the interactive components are arranged to make a self-setting resinous composition. The resin composition may be based on epoxy resin or a polyester resin; generally the resin will be a polyester resin and so for this reason further discussion will be exemplified with reference to polyester resin although it will be clearly understood that epoxy resins may be used in like fashion.

In the case of a polyester resin composition, there are usually two interactive components, one comprising an unsaturated resin, and the other comprising a hardener therefor. Specifically, the unsaturated polyester resin may be dispensed with a filler and an accelerator such as dimethyl aniline or cobalt naphthenate. The other component is a catalyst for the resin and typically comprises a filler together with a hardener such as benzoyl peroxide, methyl-ethyl-ketone or cyclohexanone.

According to the disclosure of British patent specification No. 953,056 a cartridge for the purpose specified comprises a glass tubular container within which is another glass tube. The major container contains the unsaturated polyester resin whereas the catalyst is contained within the inner glass tube. There are two disadvantages to the use of this cartridge. First, the glass tube can easily be broken accidentally either during transport or while attempting to insert the cartridge into a borehole and secondly, the resin component contains liquid styrene which is inflammable material and so its presence is not acceptable in liquid form in certain mines. For this reason, while the glass cartridge has achieved acceptance in certain markets, it has not been adopted on an universal basis.

It is disclosed in United States patent specification No. 3,731,791 to use as a cartridge a single sausage-like container comprising a plastics wall. The container houses longitudinally extending bodies of both the filled unsaturated resin and the filled catalyst therefor and these are allowed to interact within the container to form a polymerised interface which tends to inhibit further reaction between the catalyst and unsaturated resin until the components are mixed together. However, the polymerized interface is only a temporary barrier to the interaction of all the ingredients in the container to form a selfsetting polyester resinous mix and so this type of cartridge has a limited shelf life; moreover, catalyst is wasted in forming the polymerized interface.

It is disclosed in U.S. Pat. specification No. 3,385,427 to form a cartridge of two envelopes, one being telescoped within the other. To make the cartridge, it is necessary to form an inner envelope, then form an outer envelope over the inner envelope and coextensive therewith, spread the catalyst into one of the envelopes to uniformly distribute the catalyst between the envelopes then fill the inner envelope with a mixture of the unsaturated polyester resin, filler and accelerating agent and then close the ends of both envelopes together. It is extremely difficult and inconvenient to make such a cartridge and the cost is, moreover, unacceptable.

It is also known from French Patent specification No. 2,057,120 to use a single piece of plastics skin of generally rectangular form. One of the longer edge portions of the piece is coated with an adhesive and then a coating of catalyst is applied parallel thereto. The skin is then curled inwardly from the opposite edge to roll the skin into a tubular form and this is then filled with the filled unsaturated resin and the adhesive then stuck down. Once again this is a difficult cartridge to make and moreover the presence of so many layers of skin interferes with the mixing of the interactive components on rupture of the cartridge.

There is further available in the United States a cartridge formed of a single piece of plastics film which is folded into generally tubular form, one side portion of the film overlapping the other and being sealed thereto at two spaced locations circumferentially of the tube by heat sealing means. In this way one has two separate compartments each containing a respective ingredient. The presence of the double wall tends to prevent adequate inter-mixing of the components on rupture of the cartridge, and to reduce this tendency a special bolt (and this more costly) is used.

In the case of some films used to make the cartridge wall it may be difficult to heat seal the wall to itself and for this purpose the use of a heat sealable adhesive has been proposed. Typically the adhesive is applied to the film as a coating and when the portions of film to be sealed are brought together heat is applied to seal them tight. Unfortunately such adhesives are attacked by styrene which typically is present in the self-setting composition.

Whichever proposal is adopted, in addition to the manufacturing facility or a problem of shelf life of the ingredient, there remains the problem of rupturing the container so as to release the ingredients to form a self-setting mixture. In practice, the container is pushed into a borehole and then the fixing element to be secured in that hole such as an anchor bolt is advanced towards the cartridge with rotation and this rotation ruptures the cartridge, and shreds up its wall and intermixes the two components to allow them to interact to form the self-setting composition which will then secure the fixing element within the borehole.

It will be appreciated that the use of two separate compartments each having a discrete wall makes it more difficult for the rotation of the fixing element to shred up the compartment wall to allow the two interactive components to intermix.

It is an object of the invention to provide a cartridge which is an improvement in or modification of that disclosed in United States of America Pat. No. 3,731,791 mentioned above.

It is a further object of the invention to provide a cartridge formed of a single piece of plastics skin by continuous production means.

It is a further object of the invention to provide a cartridge which upon rupture of the skin allows for improved mixing of the components. It is a further object of the invention to provide a resin cartridge having improved shelf life.

It is yet another object of the invention to provide a cartridge formed of a continuous strip of plastics film or skin into generally tubular shape and having an improved seal or joint that is made as by heat sealing of an adhesive which is protected from the resin components by the positioning of the catalyst.

These and other objects of the invention are attached by a cartridge containing the interactive components of a self-setting composition, said cartridge being formed of a wall made of a single piece of skin, said wall being folded on itself into generally cylindrical form with opposite side portions being overlapped, to form an overlying side portion and an underlying side portion, the ends of said cartridge being sealed to prevent egress of said composition, the margin of said overlying side portion being secured to said underlying side portion at a location spaced from the free edge of said underlying portion whereby a short flap rooted at one side only is formed within the body of the cartridge, one interactive component being located on one side of said flap and the other interactive component being located on the other side of said flap, said components being allowed to interact within the gap between the free edge of said flap and the facing wall portion of the cartridge skin to form a polymerised interface.

Most preferably the said gap between the free edge of said flap and the facing wall portion of the cartridge skin is small to minimise the width of the said polymerised interface and also to minimise any multiplicity of skin walls.

The invention will be better understood from the accompanying drawings in which:

FIG. 1 is a transverse sectional view through a cartridge and

FIG. 2 is a longitudinally sectional view taken on lines II—II of FIG. 1.

FIG. 4 is a sectional view taken on lines 1V to 1V on FIG. 3.

Figure 3:
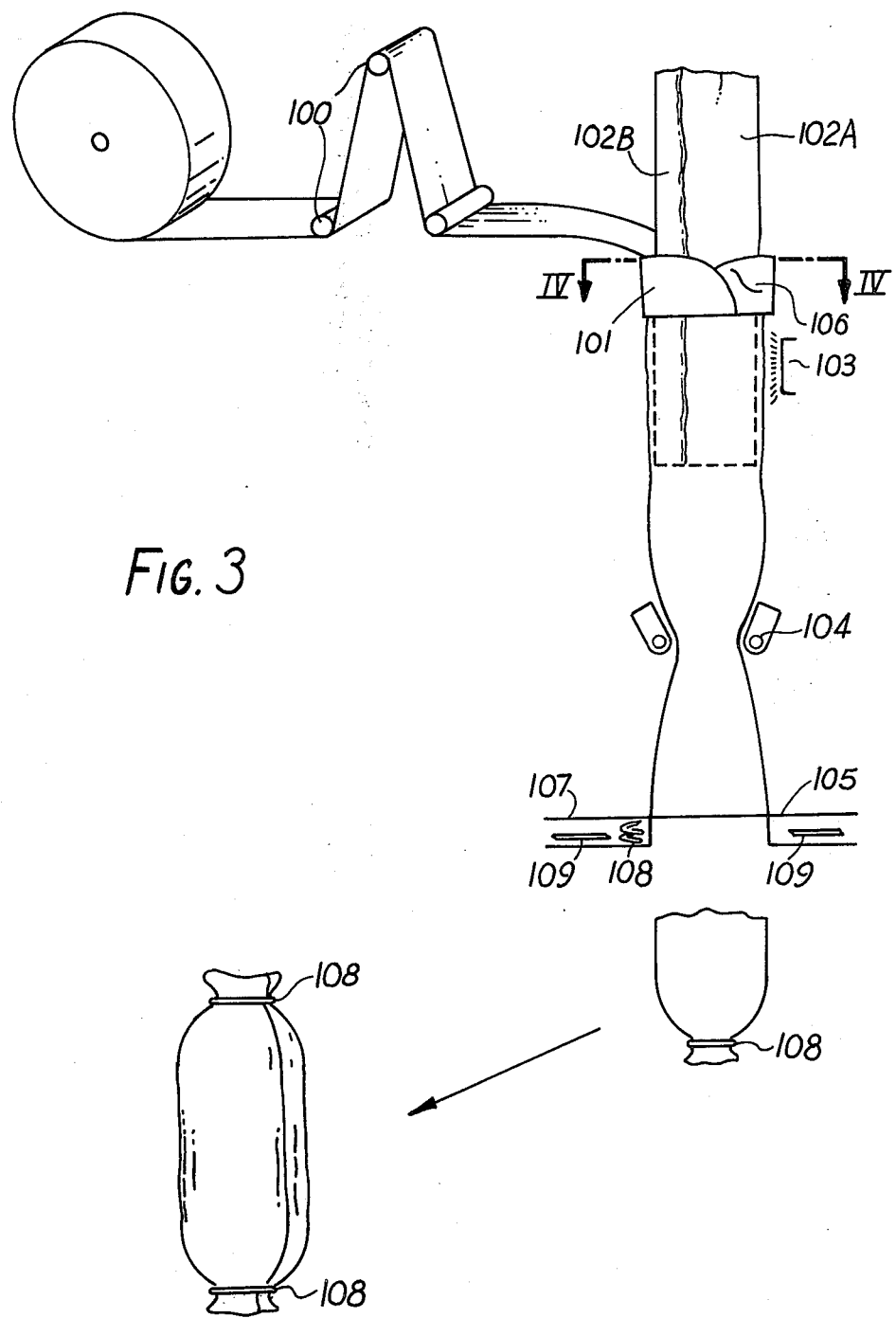
FIG. 3 is an elevational view of parts of an automatic packaging machine making cartridges showing cartridges at different stages of manufacture.

Referring first to FIGS. 1 and 2 the cartridge comprises a casing wall 1 formed of a heat sealed film for example, an inherently heat sealable film or a film having a coating of a heat sealable adhesive over its entire surface or in one or more strips. The wall 1 is bent into generally tubular shape one side portion 1A overlying the other side portion 1B. The free edge of the side portion 1A is secured by adhesive to the underlying portion of side portion 1B so as to leave a flap extending into the body of the cartridge. The body of the cartridge contains an unsaturated polyester resin and filler mixture 2 lying on one side of the flap whereas a catalyst and filler mixture 3 lies on the other side of the flap. The flap is displaced by the presence of the catalyst mixture 3 and where the catalyst mixture 3 and unsaturated polyester resin mixture 2 meet a polymerized interface is formed; the formation of a polymerised interface takes place according to the techniques of U.S. Pat. No. 3,731,791 all of the disclosure of which is hereby incorporated herein by this reference.

The machine of FIG. 3 and 4 shows a way of making a cartridge of the invention on a mass production basis. The parts shown are all mounted in a metal frame having electrical controls. For improved understanding of the invention the frame and other non essential parts are not shown, but they are a matter of ordinary design for the skilled engineer. The essential parts of the machine comprise the feed rollers at 100, a tube formed 101, a feed assembly 102, a heater 103, voider rollers 104, and a clipper/cutter device 105. These parts are explained in greater detail below.

The feed rollers 100 comprise a series of rollers arranged in line and to supply a strip of thin skin or film from a roll thereof to the tube former 101. The film has a coating of heat-sensitive adhesive, not shown, thereon. The tube former is best shown in FIG. 4. and comprises a piece of metal bent into generally cylindrical shape, one end portion X underlying the other Y leaving a gap Z between them. The inner end portion X is bent to extend towards the back of the tube former. The upper free corners of the end portions of the tube former 101 are chamfered at 106, as best shown in FIG. 3. The tube former metal is preferably covered by a low friction material such as a plastics or paint film.

The feed assembly 102 comprises a supply tube 102A and another supply tube 102B. The feed assembly is conveniently formed of steel and extends into the tube former and a short distance below it. Because one component of the cartridge mix is usually a relatively smaller volume, generally the catalyst 3, this component is fed through the nozzle 102B. The tubes 102A and 102B are hollow and the other component 2 flows down through the mandrel by gravity or by means of a positive displacement pump, not shown, having a variable speed control. Immediately below the tube former 101 and to one side of it is a bar heater 103. This may be an electric heater or a hot air heater generating heat to a temperature sufficient to melt the adhesive coating on the plastics film. Below the tube former 101 and the heater 103 and in line with the tube former is a set of pivotal voider rollers 104. These are arranged to pivot to and from the cartridge skin and to evacuate interactive component material from a length of the cartridge skin as it passes between them, so defining an empty portion.

Below the voider rollers 104 is a table 107 having a hole extending therethrough and through which the filled cartridge passes. On each side of the hole is a cassette containing a supply of clips 108, and below this is a cutter blade 109. The parts are arranged to reciprocate across the mouth of the hole to crimp a pair of vertically spaced clips 108 to the cartridge body in the area emptied by the voider rollers 104 and then to cut the portion of evacuated skin between them so defining an individual cartridge length.

In operation, the film is pulled off a roll through the feed roller system 100 towards the tube former 101. As the film is pulled through the tube former 101 it has a tendency to move from a flat film into a circular cross sectional shape but because of the overlapping portions X and Y, one edge portion of the film is over-lapped on the other so defining the flap 1B within the gap Z. As the film continues to be moved downwardly the outer free edge of the film is heat sealed continously by the heat sealer 103 so completely sealing the outside of the tube. Materials are continuously fed through the supply tubes 102A and 102B into the pockets on each side of the flap 1B. The product then consist of a filled tube which is then passed down to the voider rollers 104; these pivot towards the cartridge to clear a space within the tube of material and the cartridge then passes on to the clipper/cutter device 105. At such a device two vertically spaced apart clips 108 are applied to the evacuated area of the film and the cutter 109 then separates the individual cartridge portion from the lower end of the tube. In this way a succession of cartridges of the invention is made on a mass production basis with little or no manual operation.

Without further elaboration the foregoing description will so fully illustrate the invention in the cartridge and a method of making it but others may, by applying current or future knowledge, readily adapt the same for use under various conditions of service.

What is claimed is:

1. A cartridge containing the interactive components of a self-setting composition, said cartridge being formed of a wall made of a single piece of skin, said wall being folded on itself into generally cylindrical form with opposite side portions being overlapped to form an overlying side portion and an underlying side portion, the ends of said cartridge being sealed to prevent egress of said composition therefrom, the margin of said overlying side portion being secured to said underlying side portion at a location spaced from the free edge of said underlying portion whereby a short flap rooted at one side only is formed within the body of the cartridge, one interactive component being located on one side of said flap and the other interactive component being located on the other side of said flap, said components being allowed to interact within the gap between the free edge of said flap and the facing wall portion of the cartridge skin to form a polymerised interface.

2. A cartridge according to claim 1, wherein the said gap between the free edge of said flap and the facing wall portion of the skin is small to minimise the width of the said polymerised interface.

3. A cartridge according to claim 1, wherein the margin of the said overlying side portion is secured to the said underlying side/portion by heat sealing.

4. A cartridge according to claim 3, wherein a coating of a heat-sealable adhesive is applied to the skin and the heat sealing causes said adhesive to seal the said overlying side portion to said underlying side portion.

5. A cartridge according to claim 4, wherein said adhesive is shielded from one of said components by the other component.

6. A cartridge according to claim 1, wherein said one interactive component comprises an unsaturated resin and the other is a hardener therefor.

7. A cartridge according to claim 6, wherein the said unsaturated resin component is of relatively greater volume than the said hardener component.

\* \* \* \* \*